Jean-Louis Tocanne
INVENTOR.

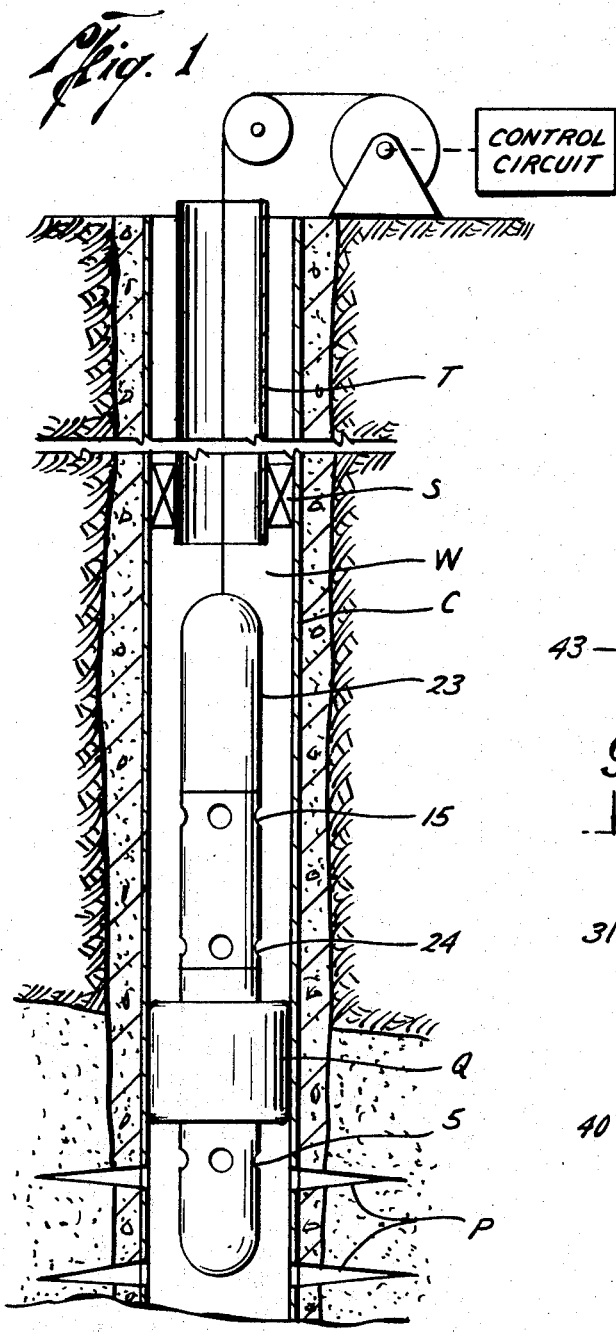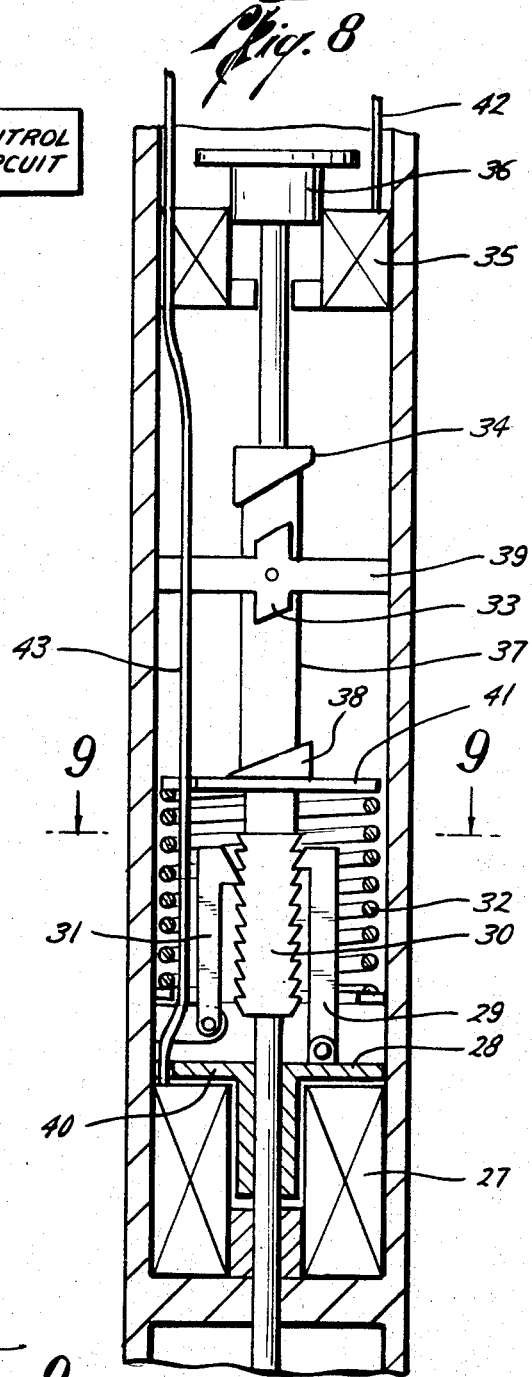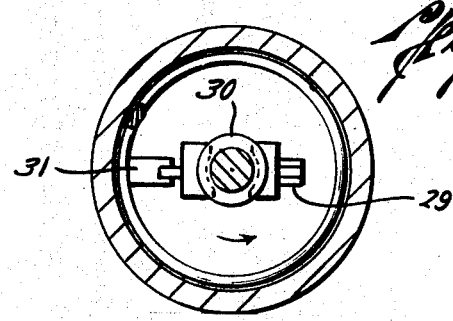

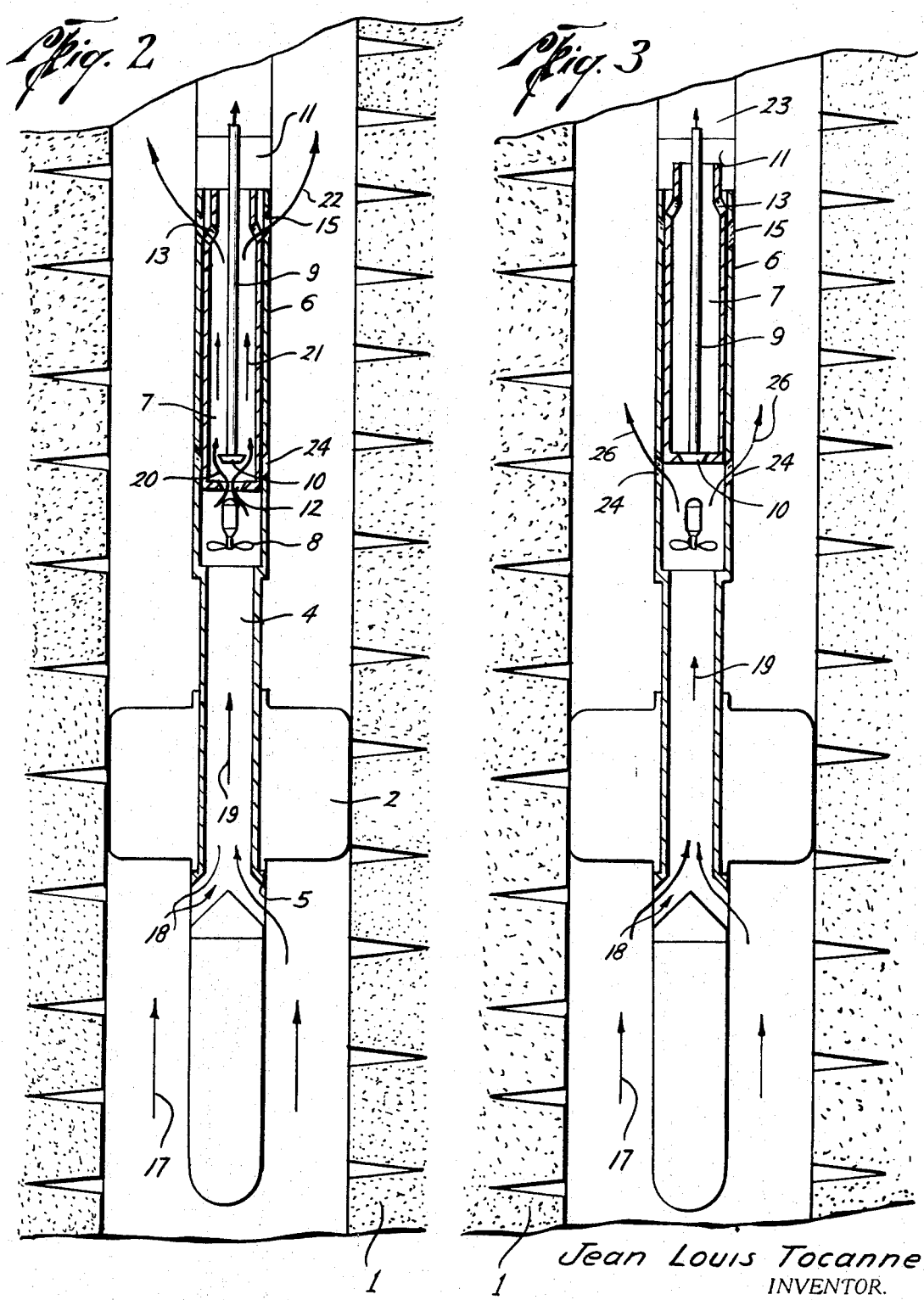

BY William J Beard

ATTORNEY

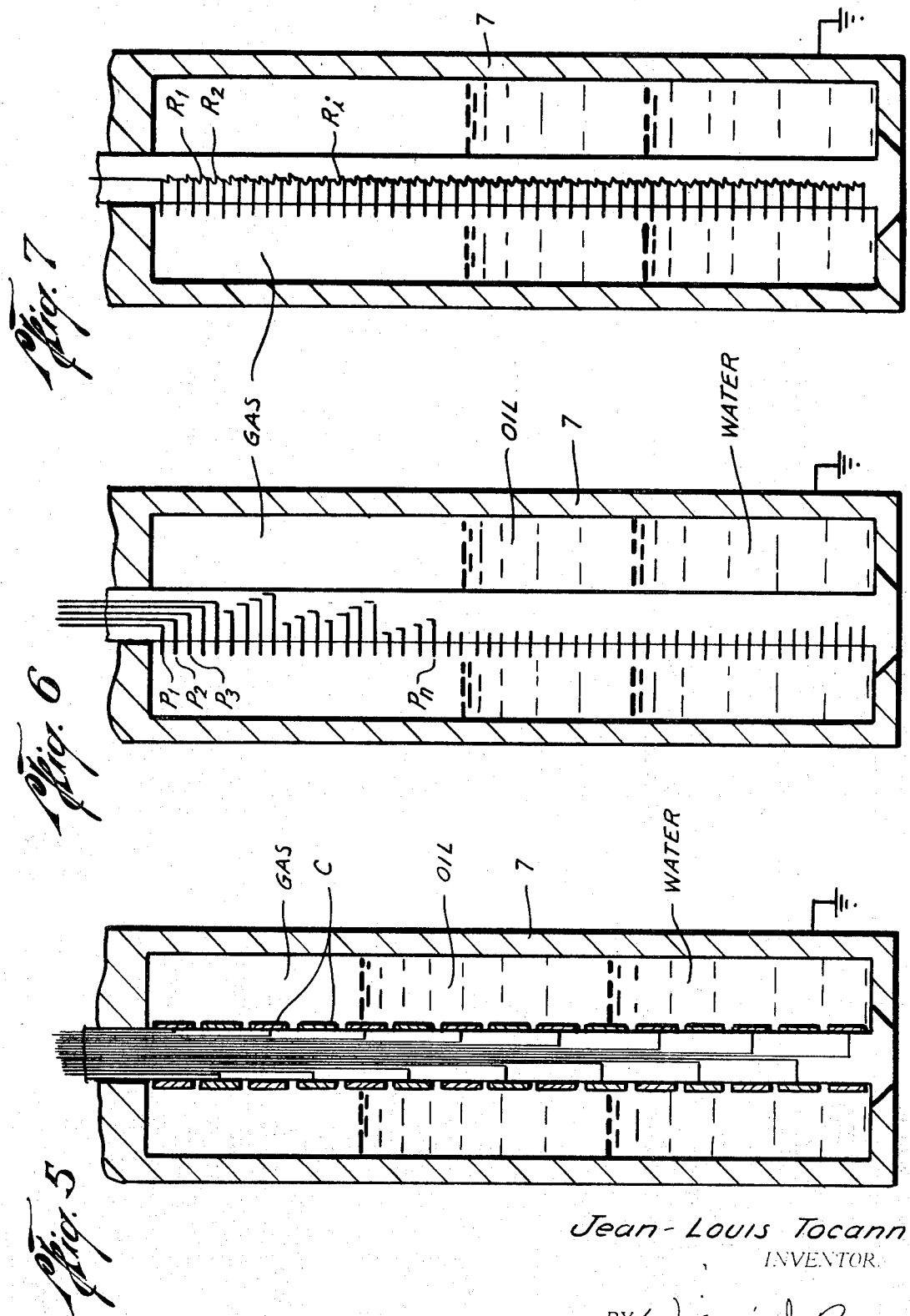

United States Patent Office 3,530,711
Patented Sept. 29, 1970

3,530,711
METHOD AND APPARATUS FOR DETERMINING THE PROPORTION OF COMPONENTS OF A MIXTURE OF FLUIDS PRODUCED BY A WELL
Jean-Louis Tocanne, Lozere-sur-Yvette, Essonne, France, assignor to Schlumberger Technology Corporation
Filed Dec. 18, 1968, Ser. No. 785,456
Claims priority, application France, Nov. 12, 1968, 173,294
Int. Cl. E21b 47/00
U.S. Cl. 73—155                                    19 Claims

ABSTRACT OF THE DISCLOSURE

Disclosed is a method and apparatus for use in a producing well for determining the relative proportion of components of the fluid mixture being produced at a given depth in the well. A well tool provided with a packer, a fluid flow passage, a sample chamber slidably mounted in the passage, a fluid bypass, a flowmeter, and interface detecting means is lowered into the well. When the tool is activated, the sample chamber is rapidly closed trapping a representative sample of well fluid at the level in question therein. The sample is allowed to separate under the influence of gravity to form fluid interfaces in the sample chamber. The level of fluid interfaces are then detected in situ by the interface detecting means and this information, indicative of the relative proportion of fluids present, is transmitted to the surface. The operation of the tool may then be recycled at a new depth.

BACKGROUND OF THE INVENTION

This invention relates to a process and an apparatus for determining the proportion, in situ, of at least one of the components of a mixture of fluids produced from an oil well and, particularly, to a process and an apparatus for determining the respective proportions of gas, oil and water content of the produced fluids.

Heretofore, a process for sampling the fluids present in a well, consisted of lowering a fluid sampling chamber into a well and, at a certain level, opening the chamber to the fluids and trapping a sample. When the chamber is closed it is brought to the surface for analysis of its content. When using such a process the samples taken are not necessarily representative of the fluids produced from a well. As a matter of fact, it is well known that water, from permeable formations in communication with the oil well, progressively accumulates by gravity at the bottom of the well. A small portion of the water is, however, often carried out of the well by the produced oil and gas.

In a number of wells, the oil- or gas-formations are thus surmounted with a static water column. As a result thereof, the oil or gas escaping from the reservoir-layers are first displaced through a column of water. During this travel it is obvious that, at a given level, the composition of the fluid mixture present at said level is very different from the composition of the fluids in motion. The same is true in the case of a well producing oil and gas. The rising speed of the gas bubbles through oil is responsible for the circulation of the two fluids in the well at very different speeds. This is a reason why the relative fluid amounts present at each given time between two levels of a well are not representative of the well production. Accordingly, it has been difficult up to now, to obtain at subsurface levels, a representative sample of fluids discharged by producing formations.

Attempts have been made to obviate this inconvenience by stopping the flow from the well during the sampling operation. In such a case, in fact, the fluids contained in the well separate from each other by gravity because of a difference in densities and, after a certain time, an equilibrium is achieved. The level of the interface between heavy and light fluids is then detected, in most cases by measurement of density, and a sample is picked up at the convenient level. Such an operation is time-consuming and, in many cases, without interest. This is particularly true when a plurality of reservoir-layers are producing in the same well; these layers are, in fact, at generally different pressures and exchange of fluids between interlayers is set up as soon as the well is closed. Moreover, the oils of different densities being miscible, it is impossible to obtain the separation by densities of the oils of different nature produced by a plurality of layers. Besides, when it is desired to know the amount of water in movement at a given level, it is obvious that the presently used method cannot provide any result. It must be further stated that, in the case where the closing of a well would result in a considerable damage, it is generally preferred to avoid sampling, in situ, the produced fluids. This is especially true in the case of steam injection wells.

Solutions have been already proposed, e.g., those described in the French Pat. 1,484,655, for picking up fluids in an oil well without stopping the production by lowering in the well a sonde, provided with a sampling chamber, at the desired level, sealing the well at said level by packer means traversed by an exhaust duct, open at both ends and of small section as compared to that of the well bore, providing communication between said duct and the inlet of the sampling chamber and, after the latter has been filled up, closing said inlet, releasing said packer means and raising the sonde. However, this solution suffers from the inconvenience of requiring the lowering and the raising of the sonde at each sampling operation.

It is an object of this invention to provide a process and an apparatus, whereby can be determined, at each selected level of a producing oil well, the characteristics of the produced fluids and particularly the composition of the produced outflow in each of its components (oil, gas and salt water).

It is another object to provide means for carrying out such determinations without having to interrupt the production of the well.

It is a further object of this invention to provide means for determining, in situ, in the well itself, the composition of a sample of fluids taken in a chamber, and for indicating directly at the surface, the composition of the fluids mixture so determined at any given level of an oil well whose production characteristics are studied. Simultaneously, with the determination of the composition of the produced mixtures, there may also be measured, in a conventional manner, the flow rate of the well section subjected to the production test.

Up to now, the determination in situ of the proportions of the different components of the produced fluid mixture, was carried out on the basis of the measurement of such parameters as the density and the dielectric constant. But, in view of the small difference in density between water and oil, the density measuring apparatus was very complex and its operating principle itself was a limitation to the accuracy of the determination of the composition of the produced fluids mixture.

On the contrary, it is possible, according to this invention, to obtain a much greater accuracy by carrying out another type of measurement comprising the following steps:

(1) Passing a representative sample of the fluid outflow of the producing well at the selected level through a sampling chamber, (2) Isolating said chamber from the fluid flow by simultaneously closing the inlet and outlet ports thereof and trapping a sample while simultaneously bypassing the produced fluids to the surface through bypass means, (3) Permitting gravity separation of the components of the static fluids in the isolated sampling chamber over a sufficient time to have the component interfaces stabilized, e.g., for 2 to 3 minutes and determining the respective levels of said interfaces, (4) Re-opening the sampling chamber to the passage of the fluids produced by the well to repeat steps 2 and 3.

During the period when the sampling chamber is isolated from the production flow, the production is continued through at least one bypass channel or duct.

The device is so arranged that the opening of the sampling chamber to the produced fluids is carried out simultaneously with the closing of the bypass and conversely, the isolated of the chamber is concomitant with the re-establishment of the fluid access to the bypass.

The step of isolating the chamber from the external fluids must be carried out very quickly as soon as the chamber is substantially filled up with the produced fluids, so as to prevent any modification in the relative proportions of the fluids therein which might result from a progressive decrease in the input rate favoring the passage of some fluids with respect to some others.

On the contrary, the step of opening the chamber to the admission of the produced fluids may be carried out in a very progressive manner, up to the obtainment of the admission rate corresponding to a full opening, i.e., to the passage of the totality of the produced fluids through the sampling chamber.

At that time, the composition of the fluid mixture present in the sampling chamber is exactly the same as that of the flowing fluids as produced by the well and it can be set into the sampling chamber by suddenly isolating the same from the exterior.

Of course, in the case of unstable flowing conditions of the fluids produced, it may be convenient to obtain a plurality of sampes successively and to average the measured values obtained from the successively obtained samples.

The characteristics and advantages of this invention will be more fully understood from the following description with reference to the accompanying drawings wherein:

BRIEF DESCRIPTION OF THE DRAWINGS

FIG. 1 is a schematic view of the tool of the present invention in its environment in a well bore, FIG. 2 illustrates, by way of non-limitative example, an embodiment of the apparatus according to the invention, with the sampling chamber shown in open position, FIG. 3 illustrates the apparatus of FIG. 1 with the sampling chamber shown in closed position, FIG. 5 illustrates a first embodiment of a level sensor for determining the levels of the interfaces between fluids in situ in the sampling chamber, FIGS. 6 and 7 illustrate two other embodiments of level sensors, similar to one another, for determining the levels of said interfaces, and FIGS. 8 and 9 illustrate means for controlling the displacement of the sampling chamber.

DESCRIPTION OF THE PREFERRED EMBODIMENT

Figure 4:
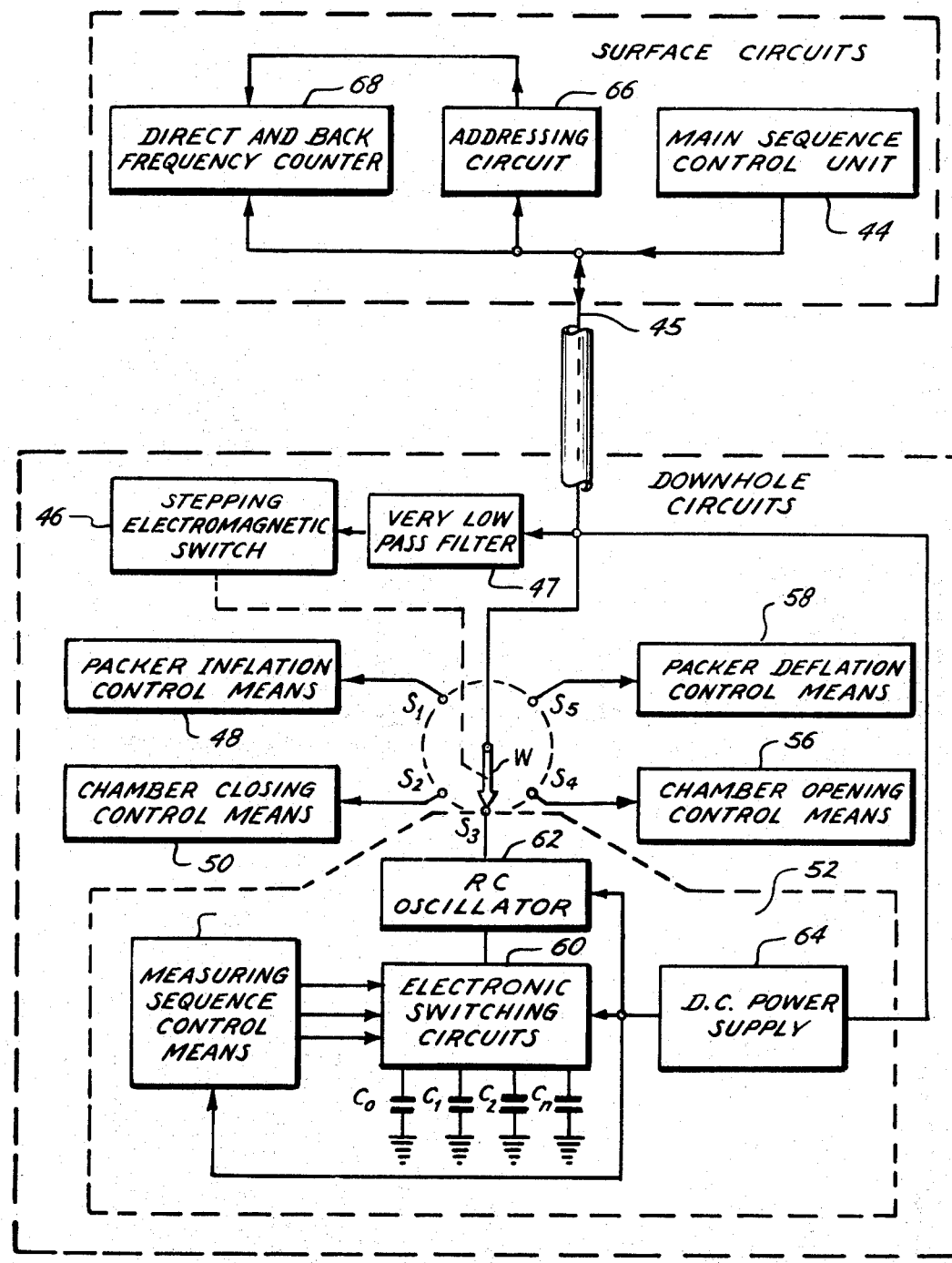
FIG. 4 is a block diagram of the measuring and control electronics of one embodiment of the present invention.

Referring now to FIG. 1, apparatus embodying the present invention is illustrated in a well bore W. The well bore traverses earth formations and is provided with a casing C suitably cemented in place and from one or more perforations P, formation fluids are produced into the bore of the casing. Above the producing formations is a string of tubing T which is provided with packer S to seal the annulus between the tubing and the well casing and production of well fluids is through the tubing to the surface of the earth.

In the practice of the present invention it is desired to measure, at one or more levels below the tubing packer, the rate of flow of the fluid and determine the relative constituent proportions of the fluid flow under dynamic flowing conditions in a well bore. By measuring at different levels the respective contribution of the fluids produced from separate perforations can be determined and from this, the well operator can decide whether to work over sections of the well to improve production.

As shown in FIG. 1, an apparatus is provided which can pass through the tubing string T and a packer element Q on the apparatus can be selectively inflated to close off the area of the well bore and channel producing fluids through the body of the tool for measuring purposes. Apparatus of this general type is illustrated in U.S. Pat. No. 3,279,249. As is typical in this kind of apparatus, the fluid from the formations enters through openings 5 below the packer and exits through openings 24 above the packer. The velocity of the channeled fluid is measured by a flowmeter unit while it is passing through the body of the tool. With respect to the present invention, it is desired to pass the flowing fluids through a sampling chamber and, at an appropriate time, (a) trap a sample within the sample chamber, (b) subsequently measure the proportions of the constituents of the trapped sample while it is in the sample chamber and (c) at the same time permit the continued flow of fluids past the tool. To accomplish this, as shown in FIG. 1, the lower set of ports 24 above the packer are normally closed while the fluids are passed through an internal sampling chamber and exit through the upper set of ports 15. At the selected time for sampling the fluid, a sample chamber within the tool is closed to close off the upper ports 15 and open the lower bypass ports 24 thus permitting continued flow of fluids while the sampled fluids are measured.

Referring now to FIG. 2, it can be seen that the production flow at level 1 of the well is stopped, in its travel toward the surface, by the expandable packer 2, sealing on the inner wall of the well. This packer 2, however, allows passage of said flow toward the surface, through a central tube or discharge duct 4, passing through the packer and having inlet ports 5 below the packer. According to the invention, the duct 4 has an upward tubular extension 6, shown on FIG. 1 of a slightly greater diameter than duct 4 wherein is placed a sampling cylinder or chamber 7, generally of cylindrical elongated shape and having a certain length hereinafter referred to as "operative length." The outer diameter of cylinder 7 is equal, except for a slight sliding clearance, to the inner diameter of extension 6. At the lower end of extension 6 is a flowmeter 8.

The opening and closing of the sampling chamber 7 to the fluid admitted in duct 4 through inlet port 5 is obtained by co-operation of a valve member 10 at the lower end of a central stationary stem 9 and a valve seat on inlet port 12 to the sampling chamber. Movement of the sampling chamber in a direction parallel to said stem permits opening and closing of the port 12.

The device 11, which controls longitudinal movement of the chamber will be described more in detail hereinafter with reference to FIGS. 8 and 9.

In FIG. 2, the sampling chamber 7 is shown in its lowermost position, the inlet port 12 of the chamber being disengaged from the valve member 10. Outlet ports 13 provided at the upper part of chamber 7 are in fluid communication with corresponding ports 15 provided in the tubular extension 6. In this position, ports 24 are closed by the wall of chamber 7. The fluid path is shown on the figure by the successive arrows 17, 18, 19, 20, 21 and 22.

In FIG. 3, the sampling chamber 7 is shown in its uppermost position where the wall of the chamber closes the upper ports 15 of the tubular extension 6 thereby disconnecting the fluid communication path between ports 13 and 15. At the same time valve member 10 seats in port 12 to close the lower end of the chambers. In the upper position of chamber 7 the lower ports 24 in tubular extension 6 are opened by movement of chamber 7 which uncovers ports 24. The path of the fluid, in this position of the sampling chamber, is shown in FIG. 3 by the successive arrows 17, 18, 19 and 26.

The central stem 9 is, according to the invention, provided with sensor means, preferentially of electrical type, for determining the levels of the interfaces between the respective fluids of a fluid sample trapped in the chamber.

The level sensor means are electrically connected, for instance, with an electrical control means 23 above the device 11 controlling the displacement of the chamber, the electrical control means providing for the change of connections or sequential switching of the various capacitors and/or resistors associated to the central stem, when the level sensor is of the type illustrated in FIGS. 5, 6 or 7.

FIG. 5 shows an enlarged view of a cross-section of the sampling chamber with the central stem 9, provided along its whole length, with a number of interface detection elements. The detecting elements are condensers C. Each of these condensers consists of two annular plates, the inner plate being insulated, from and secured to stem 9 and the other plate being formed by the wall of chamber 7.

All of these condenser elements are identical to each other. The exterior of the condensers is covered with a coating of insulating and non-wetting material, such as for instance a coating of the type described in the French Pat. 1,427,818, mainly that known under the trademark of Teflon.

The capacitance measured for each condenser comprises the capacitance of the connecting cable embedded in stem 9 to the measuring circuit, in parallel with the capacitance of a sample chamber condenser. This comprises the capacitance corresponding to the insulating layer in series with the capacitance of the condenser formed with the liquid or gaseous dielectric. Only the latter varies, depending on the level of the interfaces and, accordingly, the variations of the total capacitance are determined by the position of the interfaces. As a result of the very substantial differences between the dielectric constants of the respective fluids (=1 for the gas, about 2 to 3 for the oil and around 80 for water), the value of the capacitance of the dielectric condenser varies for example from 8 pf. for the gas to from 16 to 20 pf. for the oil and to 640 pf. for water, in the case of an annular condenser of a 10 cm. height and having circular plates with respective radii of 5 cm. and 2.5 cm.

In order to facilitate the passage of the fluid through the space between the plates of the condenser, said space should be large enough for a representative flowing sample but not too large to significantly reduce the capacitance measurement. Accordingly, a compromise is necessary between the achievement of a rapid filling of the sampling chamber and a satisfactory value of the capacitance and of its variations attributable to the change of the fluid between the plate of the condenser.

In order to carry out the capacitance measuring step, the capacitors are sequentially switched by electrical switching means carried in the upper portion 23 of the tool. This switching occurs with a recurrence period of 1 to 5 seconds, for instance as the time required for the measuring operation is of the order of $\frac{1}{10}$ to $\frac{1}{2}$ second.

FIG. 4 shows a block-diagram of the downhole and surface circuits which can be used for carrying out the measuring method according to the invention. On FIG. 4, the surface circuits comprise a control unit 44 for controlling the main sequences of the measuring process. The unit 44 is connected to the conductor 45 of the cable. In the downhole tool the conductor 45 is connected through a very low frequency pass filter 47 to an electromagnetic stepping switch 46. The control unit 44 delivers very low frequency pulses for operating the switch 46. The switch 46 comprises a wiper W and five output terminals $S_1, S_2 \ldots S_5$. The terminal $S_1$ is connected to the packer inflation control means 48, the terminal $S_2$ to the sample chamber closing control means 50, the terminal $S_3$ to the measuring means 52 of the sensing elements located in the sample chamber, the terminal $S_4$ to the sample chamber opening control means 56 and the terminal $S_5$ to the packer deflation control means 58. To have these control and measuring means operate, the panel 44 delivers an alternating current (50 to 60 hertz) either in continuous manner or in a pulsed form mainly for the sample chamber opening control means as will be explained hereafter in more detail in the comments on FIGS. 8 and 9.

In the case of FIG. 4, the fluid sensing elements located in the sample and decantation chamber are condensers secured on a stem 9 according to FIG. 5. Circuits 52 used to measure the capacitance of these condensers, comprise a measuring sequence control circuit 58 connected to an electronic switch 60 able to sequentially connect the condensers $C_1 \ldots C_n$ into an RC oscillator 62. The circuits 58, 60 and 62 are fed with a D.C. power supply 64 the input of which is connected to the cable.

The frequency of the oscillator 62 is directly dependent on the $C_1 \ldots C_n$ condensers value to which is obviously added the spurious capacitance of the wires respectively connecting said condensers to the switching circuits 60.

In order to obtain an accurate measurement of the condensers $C_1 \ldots C_n$, a reference condenser $C_0$ is used, the value of which is higher than the spurious capacitance of the cable but lower than the sum of said spurious capacitance and the lower value of the condensers $C_1 \ldots C_n$. The measuring sequence control circuit 58 is adapted to power the connecting switch of the reference condenser $C_0$ before powering each of connecting switches of the measuring condensers $C_1 \ldots C_n$. Under these conditions, before delivering a measuring frequency $F_1 \ldots F_n$, the oscillator 62 delivers a reference frequency $F_0$. All these frequency signals which are, for instance, approximately ten kilohertz and are transmitted to the surface via the cable. The surface circuits comprise an addressing circuit 66 receiving and processing the oscillator signals which alternatively delivers to a direct and back frequency counter 68 a binary order GO ON or GO BACK according to whether the received signal is of the $F_0$ frequency or of one of $F_1 \ldots F_n$ frequencies. Under these conditions, the direct and back counter 68 successively displays (or addresses to a printer) frequency differences $(F_0-F_1) \ldots (F_0-F_n)$ which are characteristic of the values of condensers $C_1 \ldots C_n$ therefore of the nature of the fluid surrounding said condenser.

When a fluid interface in the sampling chamber occurs at a level intermediate between two adjacent condensers the difference between the respective capacitances of these two condensers is an indication of the physical location of the interface at this intermediate level. Thus the measurement is capable of detecting the level of fluid interfaces in the sample chamber. When used with N condensers, the accuracy of measurement of the interface levels thus expressed is $100/N$ percent.

In the case where the interface level is located between the bottom and the top of a given condenser, the measurement of capacitance of this condenser provides an analog signal whose value is proportional to the respective height of the two fluids in contact with the condenser. By comparing the analog measurement of the capacitance of this particular condenser with that of condensers above and below it, the fluid level on the particular condenser in question may be determined with an accuracy of from 5 to 10 percent.

Another measuring system is illustrated in FIGS. 6 and 7. These circuits are used only for the detection of the water to oil interface. This method is based on the difference in conductivity between water and oil. The detecting member in the sample chamber consists of N needles, P, held along central stem 9 forming a mandrel. The needle contacts form a self-cleaning system when passing from water to oil and vice versa. Again, electrical switching means located in the upper portion 23 of the downhole tool performs successive switching to each of the needles in the chamber with an RC oscillator which oscillates at a frequency determined by the needle resistance. The resistance between each of the needles and ground potential then provides the location of the water level with an accuracy of $100/N$ percent, where N is the number of needles utilized.

A reference resistance $R_0$ and the needles $P_1$ to $P_n$ are alternatively and successively switched into the RC oscillator circuit 62 by the switching means, said oscillator and said switching means being similar to the oscillator 58 and the switch 46 of FIG. 4. Thus with an equipment at the surface similar to the surface circuits of FIG. 4, frequency differences can be recorded or printed which are characteristic of the resistivity of the fluid located in front of each needle. Detection of a discontinuity in the resistance of each of the N needles to ground, said discontinuity occurring at the interface level of the water (the water forming effectively a short circuit to ground), provides information as to the location of this interface.

According to the diagram of FIG. 7, the adjacent needles can be interconnected through electrical components such as resistors $R_i$ and encapsulated in the mandrel so as to have only one electrical output from the sensor. For example, in the series disposition of N identical resistors $R_i$ the resistance measured at the output with respect to ground provides a simple measurement of the water level in the sampling chamber. Specifically, if each resistor $R_i$ possesses a low resistance, say 100 ohms, with respect to the resistance between a needle in the oil portion and ground, then at the water interface where the effective short to ground is formed, the total resistance of the N resistors prior to this interface will be measured and will then provide a measurement accurate to $100/N$ percent of the location of this interface. In this configuration, no electronic switching means like 60 would be required to sample the N needles and only one electrical output from the sensor would be required.

Referring now to FIGS. 8 and 9, details of the sample chamber opening and closing device 11 are shown. This device provides for a quick raising (closing) of the chamber once it is filled up and a progressive opening of the chamber for recycling. Assuming the sample chamber to be in its position shown in FIG. 3 (closed), and the switch wiper W to be on terminal $S_4$ the chamber can be progressively opened to the entrance of fluids by slowly lowering it in the manner of the following description: Chamber opening control means 54 comprises an electromagnet 27 which receives pulses of A.C. current from surface control unit 44 through conductors 43 and 45. Upon receipt of each pulse, the movable armature 28, integral with pawl 29, is attracted downwardly toward the magnet 27. Pawl 29 draws down rack 30 by a distance corresponding to one of the teeth on the rack at each pulse. Rack 30 is maintained in position by means of stationary pawl 31. This phase of the movement compresses coil spring 32 to be later used for suddenly raising up the chamber and closing it. When rack 30 comes to the end of its stroke, pawl 29 becomes inoperative as its pin slides on the smooth upper portion of the rack supporting stem.

At this stage, the phase of the slow lowering of the chamber is terminated, the chamber being at its lowermost position and stop member 33 bearing against cam 34. To obtain a rapid raising (closing) of the chamber, the device is operated as follows: The wiper W of switch 46 being on terminal $S_2$ control means 44 on the surface provides a pulse of A.C. current through conductors 42 and 45 to upper electromagnet 35. Magnet 35 then attracts the internal armature 36 thereof, which imparts to the rack 30 a pivotal motion due to the action of cam 34 on stop member 33. This has the effect of disengaging the teeth of the rack 30 from the pins of pawls 29 and 31 as may be more clearly seen in FIG. 9. The new angular orientation of the rack is maintained by means of a flat provided on member 37 between cams 34 and 38 and a plate spring 39 bearing on stop 33.

When the pulse provided to magnet 35 is terminated, compressed spring 32 is released and suddenly pushes the chamber upward. At the end of its stroke, cam 38 is brought into contact with stop 33, thereby generating a reverse pivotal motion of the rack so as to bring the rack back to its initial position (occupied before the lowering of the chamber). This last mentioned position is kept stable by the action of plate 39 on the member 37. At this stage, the chamber is again at its starting position (closed) and after the measurements have been obtained, it can be lowered (opened) again in order to take another sample.

While one particular embodiment of the present invention has been shown and described, it is apparent that changes may be made without departing from this invention in its broader aspects; and, therefore, the aim in the appended claims is to cover all such changes and modifications as fall within the true spirit and scope of this invention.

What is claimed is:

1. A method for use in a producing well, for the determination, at a given depth in said well, of the relative proportion of at least one component of the mixture of fluids produced by said well, comprising the steps of:
  (a) passing a representative mixture of fluids produced by the well at the depth in question through a sample chamber;
  (b) isolating the sample chamber from the fluid flow and trapping a representative sample of the fluid therein, while simultaneously bypassing said fluid flow around the sample chamber;
  (c) separating said fluid mixture trapped in said sample chamber by allowing it to settle for a sufficient time to substantially stabilize the levels of interface between the respective fluids of said trapped sample; and
  (d) measuring, in situ in the sample chamber, at least one of said interface levels and transmitting the measured values to the surface, said values being representative of the relative content at the depth in question in the well of at least one fluid of the mixture produced by the well.

2. The methods of claims 1 and further including the steps of:
  reopening the sample chamber to fluid flow; and
  repositioning the sample chamber at a new depth in the well to sample fluid flow at the new depth.

3. A well tool for use in a well bore comprising:
  a body member, means on said body member for sealing off a well bore, a flow passage in aid body member with openings above and below said sealing means, a sample chamber in said flow passage, magnetically actuated selectively operable valve means for opening said sample chamber to said flow passage and closing said chamber to selectively trap a fluid sample in said sample chamber or to permit flow through said sample chamber.

4. Apparatus adapted for use in a producing well, for determining the relative proportion of at least one component of the mixture of fluids being produced by said well, comprising:
  packer means for isolating fluids produced at a given depth by the well;
  a body member passing through said packer means, adapted to provide fluid communication between the portions of the well above and below said packer means;

sample chamber means in said body member for sampling well fluids flowing therethrough and including inlet and outlet ports together with means for simultaneously blocking said inlet and outlet ports;

bypass means in said body member;

means for opening said bypass means simultaneously with the blocking of said sample chamber inlet and outlet ports;

means for measuring, in situ, in said sample chamber, the relative level of at least one fluid interface between fluids trapped therein, to provide a signal representative thereof; and means for transmitting said signal to the surface.

5. Apparatus according to claim 4 wherein said means for simultaneously blocking the inlet and outlet ports of said sample chamber comprises means for displacing said chamber with respect to stationary parts comprising said body member.

6. Apparatus adapted for use in a producing well, for determining at a given depth in said well, the relative proportion of at least one component of the mixture of fluids being produced by said well, comprising:

packer means for isolating fluids produced at a given depth by the well;

duct means, passing through said packer means, for providing fluid communication between the portions of the well above and below said packer means;

sample chamber means, slidably mounted in said duct means, for sampling well fluids flowing therethrough and incluidng inlet and outlet ports together with means for simultaneously blocking said inlet and outlet ports;

means for measuring the flow rate of the produced fluid mixture entering said sample chamber;

bypass means on said duct means for passing fluid flow around said sample chamber;

means for opening said bypass means simultaneously with the blocking of said sample chamber inlet and outlet ports;

electrical means for measuring, in situ in said sample chamber, the relative level of at least one fluid interface between fluids trapped therein, to provide an electrical signal representative thereof; and means for transmitting said electrical signal to the surface.

7. Apparatus according to claim 6 wherein the outlet ports of said slidably mounted sample chamber, in the lowermost position of the latter, open into said duct means substantially at the level of ports in the wall thereof connecting with the annular space between said duct means and the well casing.

8. Apparatus according to claim 6 wherein the outlet ports of said slidably mounted sample chamber, in the uppermost position of the latter are blocked by the wall of said duct means.

9. Apparatus according to claim 6 wherein the inlet port of said slidably mounted sample chamber is a central port in the lower wall of said chamber which, in the uppermost position of the latter, is blocked by a central closure member integral with a stationary central stem.

10. Apparatus adapted for use in a producing well, for determining at a given depth in said well, the relative proportion of at least one component of the mixture of fluids being produced by said well, comprising:

packer means for isolating fluids produced at a given depth by the well;

duct means, passing through said packer means, for providing fluid communication between the portions of the well above and below said packer means;

sample chamber means, slidably mounted in said duct means, for sampling well fluids flowing therethrough and including inlet and outlet ports together with means for simultaneously blocking said inlet and outlet ports;

means for measuring the flow rate of the produced fluid mixture entering said sample chamber;

at least one port in said duct means and below said sampling chamber, providing fluid communication between said duct means and the annular space between said duct means and the well inner wall, for bypassing fluid flow around said slidable sampling chamber in its uppermost blocked position;

means for opening said port in said duct means simultaneously with the blocking of said sample chamber inlet and outlet ports;

electrical means for measuring, in situ in said sample chamber, the relative level of at least one interface between fluids trapped therein, and providing an electrical signal representative thereof; and means for transmitting said electrical signal to the surface.

11. Apparatus according to claim 10 wherein said means for opening said ports in said duct means to bypass said fluid flow comprises means for sliding said sample chamber upwardly in a rapid manner with respect to stationary parts comprising said duct means and unblocking said ports in said duct means.

12. Apparatus adapted for use in a producing well, for determining at a given depth in said well, the relative proportion of at least one component of the mixture of fluids being produced by said well, comprising:

packer means for isolating fluids produced at a given depth by the well;

duct means, passing through said packer means, for providing fluid communication between the portions of the well above and below said packer means;

sample chamber means, in said duct means, for sampling well fluids flowing therethrough and including inlet and outlet ports together with means for simultaneously blocking said inlet and outlet ports;

bypass means on said duct means;

means for opening said duct means simultaneously with the blocking of said sample chamber inlet and outlet ports;

electrical power supply means for energizing an electrical circuit, said circuit including plural condenser means on a central stem in said sample chamber having spaces between the plates thereof occupied by fluid trapped in said sample chamber, for measuring in situ in said sample chamber, the level of at least one of the interfaces between fluids trapped therein and providing an electrical signal representative of said interface level; and means for transmitting said representative electrical signal to the surface.

13. Apparatus according to claim 12 wherein each of said plural condenser means has an internal cylindrical plate covered with an insulating, non-wetting, coating layer secured on said central stem of said sample chamber, and an external plate, in common with the others of said condensers, constituted by the wall of said sample chamber.

14. Apparatus according to claim 13 wherein said internal plates are arranged along said central stem at a height on the latter at least equal to the maximum height which could be reached by an interface between oil and gas in a fluid mixture trapped in said chamber, and with the spacing between adjacent of said internal plates being small with respect to the height of each plate.

15. Apparatus according to claim 12 and further including means for sequential switching of each of said plural condenser means to a circuit forming, with said condenser means, an RC oscillator;

means for measuring the oscillation frequency F, of said oscillator; and means for determining the capacity of each of said condensers by comparison of its oscillation frequency F, with the known oscillation frequency $F_0$, of the same RC oscillator circuit associated with a reference capacitor $C_0$.

16. Apparatus adapted for use in a producing well, for determining at a given depth in said well, the relative proportion of at least one component of the mixture of fluids being produced by said well, comprising:
   packer means for isolating fluids produced at a given depth by the well;
   duct means passing through said packer means, for providing fluid communication between the portions of the well above and below said packer means;
   sample chamber means, in said duct means, for sampling well fluids flowing therethrough and including inlet and outlet ports together with means for simultaneously blocking said inlet and outlet ports;
   bypass means on said duct means for passing fluid flow around said sample chamber;
   means for opening said bypass means simultaneously with the blocking of said sample chamber inlet and outlet ports; and
   a series of N insulated needles inside said sample chamber and distributed over the length thereof and means for sequentially measuring the resistance between each of said N needles and ground potential, said resistance being representative of the conductivity of the fluid at the level of the Nth needle, and a discontinuity in resistance between the Nth and N–1st needles being indicative of a fluid interface between the Nth and N–1st needles.

17. Apparatus according to claim 16 wherein the N adjacent needles of the series are interconnected with N–1 series resistors of the same resistance value.

18. Apparatus adapted for use in a producing well, for determining at a given level in said well, the relative proportion of at least one component of the mixture of fluids being produced by said well comprising:
   packer means for isolating fluids produced at a given depth by the well;
   discharge duct means, passing through said packer means and having an extension thereabove, for providing fluid communication between portions of the well above and below said packer means;
   a sample chamber slidably mounted in said duct extension, said chamber having, on its operative length, an external diameter equal, except for slight clearance, to the internal diameter of said extension and being provided with at least one fluid inlet port at its lower end and with at least one fluid outlet port at its upper end;
   lateral ports in said duct extension communicating with the portion of the well above said packer means said ports comprising upper ports and lower ports spaced less than the operative length of said sample chamber apart, said upper ports aligning with the fluid outlet port of said sample chamber when said chamber is in its lowermost position;
   a stationary central stem inside said sample chamber and terminated at its lower end with blocking means adapted to block said inlet port of said sample chamber when the lower end of said slidable sample chamber comes into abutment with said blocking means, said abutment occurring when said slidable sample chamber is in its uppermost position, and in this uppermost position leaving open said lower ports on said duct extension, said lower duct extension ports serving to bypass fluid flow around said sample chamber;
   means for displacing said sample chamber between said uppermost position and said lowermost position;
   electrical means for deriving an electrical signal representative of at least one level of fluid interface between fluids contained in said chamber; and
   conductor means for transmitting to the surface said representative electrical signal.

19. Apparatus according to claim 18 wherein said means for displacing said sample chamber comprises:
   a supporting stem integral with said sample chamber and on which is secured a rack;
   a movable pawl capable of engaging said rack;
   first electromagnet means for actuating said movable pawl;
   a stationary pawl capable of engaging said rack and maintaining its position;
   a movable member integral with said supporting stem;
   a stationary stop member;
   spring means, bearing at one end against said stop member and at its other end against said movable member, said spring means being compressed in connection with the lowering of said rack;
   means for revolving said rack supporting stem by an angle sufficient to disengage both of said pawls from said rack;
   second electromagnet means for actuating said revolving means; and
   means for re-engaging said pawls with said rack when said sample chamber attains its uppermost position.

References Cited
UNITED STATES PATENTS

| | | | |
|---|---|---|---|
| 3,130,808 | 4/1964 | Walker et al. | 73—155 X |
| 3,323,361 | 6/1967 | Lebourg | 73—155 |
| 3,368,404 | 2/1968 | King | 73—155 X |

JERRY W. MYRACLE, Primary Examiner